Nov. 7, 1933.  R. J. NORTON  1,934,444
BRAKE DRUM
Filed July 16, 1931
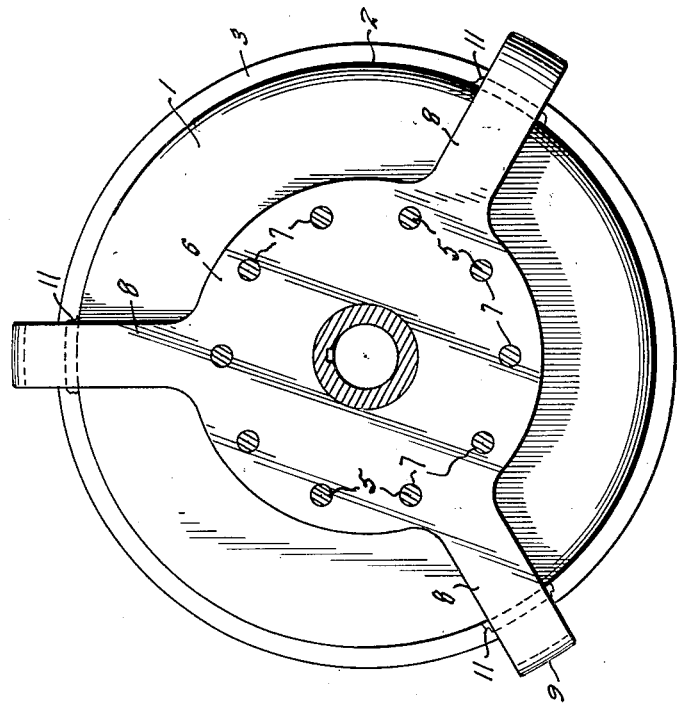
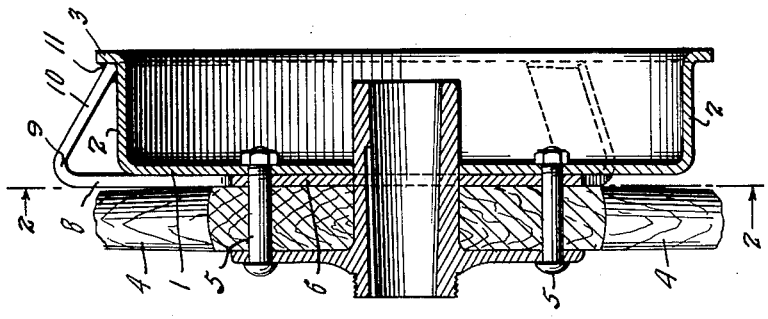
Inventor
RAYMOND J. NORTON
By Semmes & Semmes
and M. W. McConkey
Attorneys Patented Nov. 7, 1933

1,934,444

UNITED STATES PATENT OFFICE 1,934,444

BRAKE DRUM

Raymond J. Norton, Washington, D. C., assignor to Bendix Brake Company, South Bend, Ind., a corporation of Illinois Application July 16, 1931. Serial No. 551,141

5 Claims. (Cl. 188—218)

This invention relates to improvements in brake drums.

One distinct and well recognized disadvantage of the modern brake is its tendency to squeal. This is a particularly difficult objection to obviate due to the fact that it results from a complexity of factors. The major factor involved in squealing of brake drums is generally conceded to be the vibratory characteristics of the drum. The general concensus of opinion is that the braking flange of the drum constitutes a vibrating plate and that the drum head integrally connected with it constitutes a sonorous body, so that the drum in toto from the acoustical standpoint represents a bell-shaped member. The usual explanation given for the noise set up by a brake drum is that the brake shoe, including in its composition resinous substances, constitutes so-to-speak a bow drawn against a portion of a vibratable metallic member or plate. Under certain conditions the application of the brake causes the braking flange of the drum to vibrate. This vibration or series of small mechanical impulses is assumed to cause a vibration of the drum head in consonance with the vibration of the braking flange. This resonance or reenforcement of the sound by the drum head under the proper condition causes notes or combinations of notes of rather high intensity, which is generally known as squeal.

Some attempts have been made in the past to modify this generation of sound. As far as is known these deal largely, if not entirely, with the idea of damping the sound, conceded that it is once produced. These proposed and other methods have a beneficial action in minimizing the effects of the vibration of the drum, although it is highly doubtful that they are eliminated entirely.

The present invention relates to a method of minimizing the squealing or noise emanating from brake drums by generally modifying the tonal effects of the drum and particularly by modifying the intensity of the sound produced. In the preferred form of the invention not only are the acoustical properties of the drum distinctly modified but advantage is taken of the mechanisms utilized to effect these acoustical variations to insure additional mechanical advantages. In order to enable a more ready comprehension of the invention a typical physical embodiment is shown in the accompanying drawing, in which:

Fig. 1 is a cross sectional view of a brake constructed in accordance with the invention, and Fig. 2 is a side elevation of the brake drum unit.

As is known, musical notes have three leading qualities, namely pitch, intensity and timbre. From both esthetical and mechanical consideration, the timbre or quality of the note emitted from brake drums is not considered. The two important factors, therefore, are the pitch and intensity and the disagreeable character of a brake drum squeal is due to these two factors, and probably largely to the intensity of the sound. The pitch of the note or notes emitted by the brake drum depends upon the number of vibrations per second. Since from the acoustical standpoint the brake drum is in fact a plate which is subjected to transverse vibrations, a general law for the transverse vibrations of plates applies to these elements. This law broadly is that the number of transverse vibrations in a given time varies directly as the thickness of the plate and inversely as the square of its length. It would be theoretically possible, by modifications of the thickness of the braking flange of the drum and its length (i. e. the width of the braking flange) to considerably modify the tonal qualities of the drum either by diminishing the number of vibrations per second below audibility or increasing them above audibility. The mechanical considerations of brake drum manufacture and use, however, almost preclude any such modifications.

The disagreeableness of the brake drum noise or squeal is due not only to the pitch but to the intensity of sound, and of these two factors the intensity probably is more important. There are a number of causes which influence the intensity of sound. These generally considered are, the distance of the sounding body from the ear, the density of the air at the point of production of the sound, direction of air curents, presence of sonorous or resonant bodies and the amplitude of vibration. Certain of these factors for mechanical reasons cannot be modified in an automobile brake, such for example as the distance of the sounding body from the ear, the direction of air currents, density of the air, etc. Of these the amplitude of vibration is of particular importance in the present circumstances as the intensity of the sound increases as the square of amplitude of oscillation. It follows therefore that in a brake drum of given acoustical properties, if the amplitude of vibration of the sounding body is diminished the intensity of the squealing sound and its disagreeable effect could be correspondingly diminished.

The present invention deals with such diminution in intensity. Generally considered the invention comprehends the idea of fixing the free or marginal edge of the brake drum so as to check its freedom of vibration and not only modify the tonal characteristics generally but to distinctly limit the amplitude of vibrations of the braking flange.

As shown in the accompanying drawing, this concept may be effectuated by providing the conventional brake drum having a head 1 and a braking flange 2 made up of any desired material and in any preferred shape. The brake drum may or may not be formed with a marginal lip 3. This drum, as is conventional in the art, is secured to the wheel 4 by means of any suitable type of securing means, such as the bolt and nut construction 5.

In accordance with the present invention there is associated with the brake drum a series of rigid rod-like members which are firmly attached to the free edge of the drum in such a position as not only to check its free lateral or transverse vibration but also to impart mechanical stiffness and rigidity to it. This function, of course, may be accomplished by a number of specific physical means, one illustrative form of which is shown. This may comprise a central plate 6 interposed between the wheel and the brake drum, which plate is provided with apertures 7 registering with the usual apertures in the brake drum through which the securing means 5 pass. This plate is preferably provided with integral extensions in the nature of arms or spiders 8 which extend in a vertical plane to a position above the lateral plane of the braking flange 2. These rods or arms 8 are then bent downwardly as at 9 to provide the diagonal integral extensions 10. These extensions preferably abut the brake drum at some position near its free edge and are integrally secured thereto, as for example by a suitable fusion joint 11. It will be seen that with this construction as the brake shoe is applied any tendency of the brake flange 2 to expand, either due to mechanical expansive force or to thermal effects, will be materially checked by means of the members 10 which in effect act as compression struts. Furthermore, any tendency of the free or marginal edge of the brake drum to vibrate or oscillate is damped or checked by means of the elements 10. This vibration damping of the members may be accentuated by suitably choosing the material of which the elements 10 are constructed with respect to the material of the brake drum. Preferably that material should be chosen which has a modulus of longitudinal elasticity which is different from the modulus of elasticity of the drum.

Considering the element 10 as a rod, it will be seen that in fact it has two nodes, one at the junction 9 and one at the junction 11, so that longitudinal vibrations of this member are substantially damped. This construction also materially checks vibration of the drum itself. In order to secure magnified tonal effects from a plate it is necessary that either the free edge of the plate or a central apertured section be permitted to vibrate. In the present drum construction the central portion of the plate, that is the brake drum, is firmly clamped against the wheel by means of the elements 5 and the free edge is fixed by means of the rods or member 10. With this type of construction therefore, for a given exciting force the intensity of the sound emitted due to vibration will be considerably diminished.

While a preferred embodiment of the invention has been described, it is to be understood that this is given merely as one example of carrying out the principles of the invention. The invention is conceived to reside broadly in the idea of diminishing the intensity of the sound produced at the source and in this respect is to be sharply distinguished from prior art proposals of absorbing the sound produced. Other methods of obtaining this improved result by other specific structures will readily suggest themselves to those skilled in the art, but any and all of such modifications embodying the principles of the invention are intended to be comprehended within the spirit of the appended claims.

I claim:

1. The method of minimizing the squealing of brake drums which comprises anchoring the free edge thereof to substantially prevent free vibration thereof.

2. A brake drum comprising a head and flange and a strut member attached adjacent to the marginal edge of the flange and adapted to check radial movement thereof.

3. A brake drum comprising a head and flange and a compression strut attached to the extension of the flange adjacent the marginal edge thereof.

4. A brake drum comprising a head and flange and means attached to the flange and acting in compression to check radial vibrations thereof.

5. The method of minimizing squealing of a brake drum having a braking flange with a free edge, which comprises fixing the free edge to limit the vibration thereof.

RAYMOND J. NORTON.